July 7, 1964
W. H. KOSS
3,140,129
SEALED ANTI-FRICTION BEARING
Filed Feb. 27, 1962
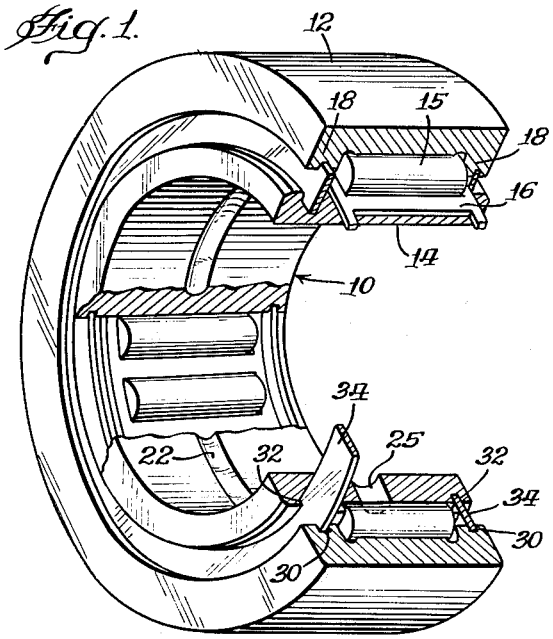
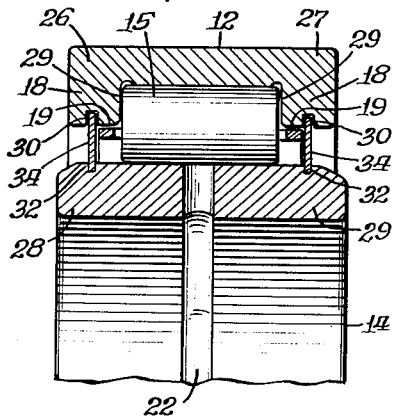
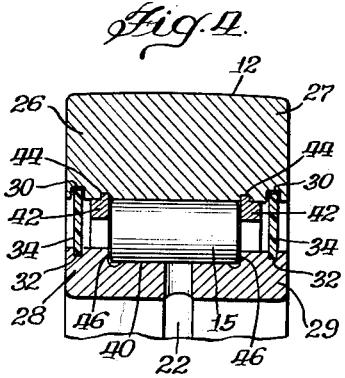
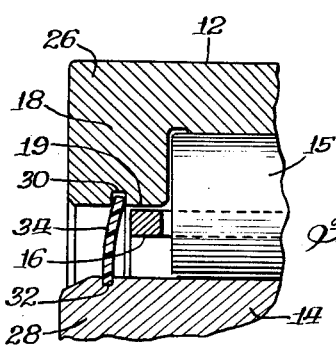
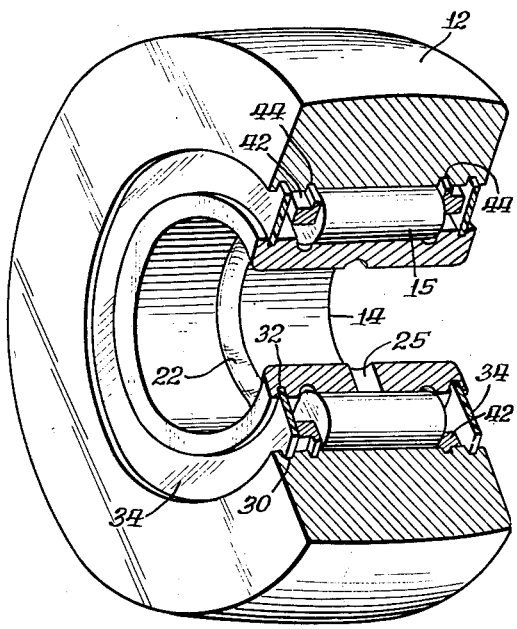
INVENTOR.
William H. Koss
BY Mueller & Aichele
Attys.

United States Patent Office 3,140,129
Patented July 7, 1964

3,140,129
SEALED ANTI-FRICTION BEARING
William H. Koss, Hobart, Ind., assignor to McGill Manufacturing Company, Inc., Valparaiso, Ind., a corporation of Indiana
Filed Feb. 27, 1962, Ser. No. 175,973
2 Claims. (Cl. 308—187.2)

This invention relates generally to bearing assemblies, and relates more particularly to anti-friction bearing assemblies having an improved sealing structure which is secured against axial movement from pressures exerted by foreign matter and which provides an effective seal for keeping such foreign matter out of the bearing assembly.

Although there are many constructions for anti-friction bearings such as roller bearings, known assemblies require a great deal of maintenance and wear out rapidly in certain particularly rigorous applications. Even though grease or other lubricants can be applied to and retained in the bearing assembly for satisfactory operation during its normal life, foreign particles such as dirt may, when applied with sufficient axial pressure, work their way through the end seals and into the bearing assembly to cause premature failure. Known bearings designed for such vigorous and heavy duty applications employ complex and extensive seal configurations to keep foreign particles out of the bearing assembly. In addition, in requiring a great deal of axial space, thereby reducing the effective bearing surface which may be employed for a given space, such sealing structures often have a small radial cross-section and require a close fit with the bearing races. It is desirable from the standpoint of convenience and economics of assembly to provide a sealing structure which may be applied to a completed bearing assembly so that the sealing structure may be used with either separable or non-separable type bearing assemblies, so as not to require that the sealing structure be applied as an integral part of the assembly procedure. For heavy duty applications such a structure must further provide an adequate seal to keep foreign particles out of the bearing assembly and at the same time utilize a minimum of space to perform its sealing function so that larger area bearing surfaces may be utilized in a given space.

It is therefore among the objects of this invention to provide an anti-friction bearing assembly having an improved lubricant seal for longer operating life.

It is another object of the invention to provide a simple sealing means for a bearing assembly capable of withstanding axial pressures exerted by foreign matter to prevent such matter from entering the bearing assembly.

Another object is to provide an economical yet reliable sealing structure for a bearing assembly for use with either a separable or non-separable type anti-friction bearing assembly.

A feature of the present invention is the provision of a bearing assembly having an inner race ring and an outer race ring for receiving a plurality of anti-friction bearings, with axially disposed sealing means having a close fit with a groove in the inner race and a running or loose fit with a groove in the outer race for forming lubricant seals at the ends of the bearing assembly.

Another feature is the provision of an anti-friction bearing assembly having inner and outer race rings for maintaining a plurality of bearings in position and thin annular sealing rings having a relatively large radial dimension to enable their insertion into retaining grooves in the race rings after the bearings and the race rings have been assembled.

A further feature of the present invention is the provision of a sealed bearing assembly having inner and outer races for maintaining individual bearings in position and annular axial sealing rings secured against displacement by a press fit in a groove in one of the races and forming either a surface contact or a labyrinth seal with a groove in the other race. The sealing rings are of thin, resilient material so that they require a minimum of space in the assembly and may be employed with either separable or non-separable bearing assemblies.

The invention is illustrated in the accompanying drawings in which:

FIG. 1 is a perspective view, partly in section, showing a roller bearing assembly having grooved races for retaining the sealing structure in accordance with one embodiment of the invention;

FIG. 2 is a fragmentary cross-sectional view of the bearing assembly of FIG. 1;

FIG. 3 is a perspective view, partly in section, of a modification of the bearing assembly of FIGS. 1 and 2, in which a full complement, non-separable bearing assembly is provided with the sealing means of the present invention;

FIG. 4 is a cross-sectional view of the bearing assembly of FIG. 3; and

FIG. 5 is a cross-sectional view of the bearing assembly of either FIGS. 1 or 3 showing an alternative arrangement of the sealing structure of the present invention.

The bearing assembly of the present invention has self-contained labyrinth or contact seals which effectively exclude foreign matter from the bearing and which withstand the axially directed pressures exerted on the bearing assembly by such foreign matter. The bearings employed may conveniently be roller bearings and the bearing assembly includes an inner race ring and an outer race ring forming a raceway for receiving a series of such roller bearings. An inner portion of the outer race ring and an outer portion of the inner race ring have grooves formed around their periphery near their axial ends. Circular sealing rings having a relatively large radial dimension are inserted in and retained by the opposite or nearby oppositely disposed grooves near the axial ends of the completed bearing assembly. Each sealing ring forms a press or interference fit with the groove in the outer surface of the inner race ring, which functions to position and secure the sealing ring to prevent axial displacement caused by foreign material. The sealing rings further form a running fit with the grooves in the inner surface of the outer race ring so that labyrinth seal is thereby provided between each sealing ring and the outer race ring, or alternately the sealing rings may be retained by slots which are axially displaced so that a contact seal is provided with the side walls of the slots in the outer race ring.

Referring specifically to the drawings, the bearing assembly of FIGS. 1 and 2 is of the separable type in which the rollers are positioned by a retention cage or segmented retainer. The bearing assembly 10 includes an outer race ring 12 and an inner race ring 14 having a common axis and which form a raceway between the respective outer and inner faces thereof. A series of roller bearings 15 are positioned in the raceway by segmented retainer means 16. This retention cage rides on and is supported by a land 19 provided on shoulder portion 18 of outer race ring 12. A groove 22 is provided around the central portion of the inner diameter of inner race ring 14 and an opening 25 extends from this groove into the raceway for supplying lubricant to the raceway.

End portions 26, 27, 28 and 29 of the inner and outer race rings extend axially beyond the ends of the roller bearings, as shown in FIG. 2. In addition, outer race ring 12 is provided with flange portions 18 having lands 19 to support retention cage 16 and further having a shoulder portion 29 to guide and retain individual ones of bearings 15 against axial thrust. As can be seen from FIGS. 1 and 2, it is not necessary to provide close or critical clearance between flange portion 18 of outer race ring 12 and the outer diameter of inner race ring 14. This space between the inner and outer race rings is provided with a sealing structure in the manner hereinafter described.

A pair of depressions or grooves 30 extend radially into flange portions 18 of outer race rings 12 while an oppositely disposed pair of grooves 32 extend radially into the outer diameter of inner race ring 14. Sealing rings 34 are positioned within these depressions or grooves. A press or interference fit is provided between a portion of the inner diameter of sealing rings 34 and grooves 32 to maintain rings 34 in position and to resist their axial displacement by foreign material. A close running fit is provided between a portion of the outer diameter of sealing rings 34 and grooves 30. The axial clearance between sealing rings 34 and the side walls of grooves 30, exaggerated in the drawing, is preferably in the order of from .007 to .016 inch, while the radial clearance is not critical, for reasons hereinafter discussed. This arrangement provides an effective labyrinth seal between the running surface provided by grooves 30 in outer race ring 12 and sealing rings 34 to effectively keep dirt and foreign matter out of the raceway, and at the same time serves as a lubricant seal to keep lubricants within the bearing assembly.

It is to be noted that the distance between the inner surface of flange portion 18 on outer race ring 12 and the outer diameter of inner race ring 14 is relatively large and accordingly sealing ring 34 has a large radial cross-section. Sealing ring 34 is also relatively thin with respect to its radial cross-section and when made of proper resilient material can easily be flexed and inserted into grooves 30 and 32 after the bearing assembly has been completed. Sealing rings 34 may be made from a suitable rigid but slightly resilient material, preferably punched from plastic or synthetic material such as nylon to form a resilient yet flexible sealing structure. When the preferred nylon and plastic materials are used, it is known that they tend to cold flow after substantial continued use so that they will conform themselves to their available confining space. In addition, many plastic materials, and particularly nylon, are known to have self-lubricating properties so that close tolerances with grooves 30 and 32 are not needed. If nylon or plastic sealing rings 34 lose their interference fit with grooves 32 after continued use, an effective labyrinth seal is still maintained between the sealing ring and the groove, while at the same time the groove continues to retain its positioning function to resist axial displacement. Thus, the above-described sealing assembly allows the use of economical material and permits convenient assembly while at the same time providing effective sealing for long operating life.

A modified construction of the sealing arrangement of the present invention, utilized with a full complement, non-separable bearing assembly, is shown in FIGS. 3 and 4. In most respects the structure therein shown is the same as in the embodiment of FIGS. 1 and 2 and the same reference numerals are applied to like parts. In this embodiment flange portions 18 of outer race ring 12 have been eliminated. Grooves 30 are provided on a portion of the inner diameter of outer race ring 12 extending axially beyond the ends of bearings 15. These grooves are disposed opposite grooves 32 to receive sealing rings 34 in the manner described above. In addition, a second pair of grooves or depressions 44 are provided on the inner diameter of outer race ring 12. The grooves 44 receive and locate snap rings 42 which function to position and secure bearings 15 against axial displacement. Inner race ring 14 has a depressed portion 40 to also receive bearings 15 and shoulder portions 46 to align the bearings and to further provide a surface to resist axial thrust on the bearings. Grooves 32 are provided on the inner diameter of inner race ring 14 to secure sealing rings 34 by forming an interference fit therewith. It is to be noted that a retention cage is not used, but rather a full complement of roller bearing is provided in the raceway. When snap rings 42 are placed in position, a locked, non-separable bearing assembly is completed. Sealing rings 34 then may be applied to the completed assembly in a manner previously discussed. This arrangement therefore provides a simple and convenient sealing structure which may be applied to a non-separable bearing assembly after complete assembly of the bearing elements and the race rings. Since the grooves retaining the sealing rings are self-contained in the race rings and are readily accessible after assembly, it is not necessary to provide any additional sealing or retaining devices during bearing assembly.

As can be seen from FIG. 5 of the drawings, grooves 30 and 32 are displaced slightly in the axial direction from one another so that they are no longer in exact radial alignment. This axial displacement may be approximately a groove width, although a greater or lesser degree of displacement may be used for a particular application. When sealing rings 34 are inserted into grooves thus displaced, they remain flexed slightly in the manner shown. The result is that there is a pressure contact between portions of the outer periphery of sealing rings 34 and the walls of grooves 30. This contact is made between both sides of each sealing ring and both side walls of the grooves so that an effective contact seal is obtained between sealing rings 34 and running surfaces provided by grooves 30 of outer race ring 12. An interference fit is provided between the inner periphery of sealing rings 34 and grooves 32 on inner race ring 14 to secure the sealing rings against axial displacement in the manner previously discussed. By use of nylon or plastic sealing rings having self-lubricating properties frictional drag between the inner and outer race rings is negligible. In addition, if sealing rings of these materials tend to lose their resiliency with time, they remain positioned by grooves 30 and 32 to provide a double labyrinth seal. When the nylon or plastic sealing rings are punched out of sheet material, there usually is created, as the result of the punching operation, sharp edges on one face of the sealing ring, and coined edges on the other face of the sealing ring. This enhances the effective sealing path whenever the sealing rings function to provide a labyrinth seal with the grooves in the race rings.

Since a press fit of nylon or other plastic material with the groove in the inner race ring results in a natural circumferential deformation of the sealing ring, there is a tendency of the sealing ring to snap or to flex either inwardly or outwardly to form a contact seal with the side walls of the groove in the outer race ring. This occurs whether the grooves on the two race rings are aligned or misaligned and increases the effectiveness of the contact seal during sustained operating periods, notwithstanding the loss of resiliency of the sealing ring.

Although groove 30 is shown in FIG. 5 to be inwardly displaced in the axial direction of the bearing assembly with respect to groove 32, it is obvious that groove 30 may also be outwardly displaced with respect to groove 32. It is also apparent that grooves 30 and 32 may be retained in substantial radial alignment, and that a lubricant seal may be provided with groove 30 by making the radial dimension of sealing rings 34 slightly larger than the distance between the bottom surfaces of the grooves so that when sealing rings 34 are in position they remain flexed either inwardly or outwardly to provide a contact seal with the side walls of groove 30.

The invention provides therefore a sealed bearing assembly which may be conveniently fabricated. Anti-friction bearings are assembled between retaining raceways and after assembly sealing rings are inserted in the axial ends thereof to retain lubricant in the bearing assembly and to impede flow of foreign particles into the bearing assembly. The sealing structure requires a minimum of space, uses economical and easy to fabricate parts and can be applied with equal ease to separable or non-separable type bearing assemblies. When used with separable bearing assemblies, the flexibility of the sealing rings allows relative axial movement between the inner and outer race rings with no loss of sealing effectiveness. At the same time the low coefficient of friction of material such as nylon permits such axial movement to take place without increasing the frictional drag of the bearing assembly. The sealing rings provide an effective long life seal between the inner and outer race rings of the bearing assembly while at the same time allowing for free relative rotation between the inner and outer races of the bearing assembly. The sealing rings are firmly secured in position between the inner and outer race rings to resist displacement by pressure axially directed by foreign material.

I claim:

1. In an anti-friction bearing having an outer race unit and an inner race unit which are adapted when in operating installation to rotate freely relative to one another, the combination providing a seal at the axial ends of the bearing and between said two race units which permits a free running bearing as to the race units thereof, said combination comprising an annular groove extending radially inwardly in at least one axial end portion of said outer race unit, an annular groove extending radially outwardly in at least one axial end portion of said inner race unit, each said groove defined on both axial sides by lands on said race units, with said grooves in corresponding end portions of said race units axially displaced from one another when said bearing is in operating installation, a flat annular one-piece sealing ring of essentially rigid but slightly resilient non-metallic material secured by and extending between said grooves in corresponding end portions of said race units, said sealing ring having a first peripheral surface and extending radially into a corresponding annular groove in one race unit to provide a running contact fit therewith and a second peripheral surface extending into a corresponding annular groove in the other race unit to provide an interference fit therewith, with said sealing ring supported solely by engagement with said grooves, and with each sealing ring being slightly flexed in an axial direction when in operating installation to provide a contact seal with the walls of said one groove and being secured to resist axial displacement by said interference fit with the other groove, whereby said sealing ring seals the axial end of the bearing to retain lubricant at the anti-friction elements thereof and to exclude foreign material therefrom.

2. In an anti-friction bearing having an outer race unit and an inner race unit which are adapted when in operating installation to rotate freely relative to one another, the combination providing a seal at the axial ends of the bearing and between said two race units which permits a free running bearing as to the race units thereof, said combination comprising an annular groove extending radially inwardly in at least one axial end portion of said outer race unit, an annular groove extending radially outwardly and at least one axial end portion of said inner race unit, each said groove defined on both axial sides by lands on said race units, with said grooves in corresponding end portions of said race units axially displaced from one another when said bearing is in an operating installation, a flat annular one-piece sealing ring of essentially rigid but slightly resilient non-metallic material secured by and extending between said grooves in corresponding end portions of said race units, said sealing ring having a radial dimension relatively large in relation to the thickness thereof, said sealing ring having an outer peripheral surface extending radially into said groove in said outer race unit to provide a running contact fit therewith and an inner peripheral surface extending into said groove in said inner race unit to provide an interference fit therewith, with said sealing ring supported solely by engagement with said grooves, and with said sealing ring being slightly flexed in an axial direction when in operating installation to provide a contact seal with the walls of said groove in said outer race unit and being secured against axial displacement by said interference fit with said groove in said inner race unit, whereby said sealing ring seals the axial end of the bearing to retain lubricant at the anti-friction elements thereof and to exclude foreign material therefrom.

References Cited in the file of this patent

UNITED STATES PATENTS

| | | |
|---|---|---|
| 1,722,488 | Bott et al. | July 30, 1929 |
| 1,970,449 | Gibbons et al. | Aug. 14, 1934 |
| 2,566,448 | Heintz et al. | Sept. 4, 1951 |
| 2,600,433 | Saywell | June 17, 1952 |
| 2,838,349 | Maas | June 10, 1958 |
| 2,856,247 | Anderson | Oct. 14, 1958 |
| 2,991,133 | Gregg | July 4, 1961 |
| 3,010,771 | Cogger | Nov. 28, 1961 |